United States Patent
Seo et al.

(10) Patent No.: US 11,652,384 B2
(45) Date of Patent: May 16, 2023

(54) TERMINAL ASSEMBLY FOR TRACTION MOTOR

(71) Applicant: HYUNDAI MOBIS CO., LTD., Seoul (KR)

(72) Inventors: Yeong Woo Seo, Yongin-si (KR); Jong Bin Park, Yongin-si (KR); Hyun Ho Park, Yongin-si (KR); Jung Kyu Yim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 175 days.

(21) Appl. No.: 17/133,374

(22) Filed: Dec. 23, 2020

(65) Prior Publication Data
US 2021/0218309 A1    Jul. 15, 2021

(30) Foreign Application Priority Data
Jan. 9, 2020 (KR) .................... 10-2020-0003352

(51) Int. Cl.
*H02K 3/52* (2006.01)
*H02K 11/25* (2016.01)
*B60K 1/00* (2006.01)
*H02K 7/00* (2006.01)

(52) U.S. Cl.
CPC ............... *H02K 3/522* (2013.01); *B60K 1/00* (2013.01); *H02K 7/006* (2013.01); *H02K 11/25* (2016.01); *H02K 2203/09* (2013.01)

(58) Field of Classification Search
CPC . B60K 1/00; H02K 3/52; H02K 3/522; H02K 7/006; H02K 11/00; H02K 11/25; H02K 2203/09

USPC .................................. 310/68 C, 68 R, 71, 89
See application file for complete search history.

(56) References Cited

U.S. PATENT DOCUMENTS

| | | | |
|---|---|---|---|
| 2012/0111145 A1* | 5/2012 | Maekawa | B60L 3/0061 180/65.245 |
| 2022/0149691 A1* | 5/2022 | Willacker | G01K 1/16 |
| 2022/0320970 A1* | 10/2022 | Takada | G01K 1/14 |
| 2022/0393544 A1* | 12/2022 | Fujii | H02K 21/02 |

FOREIGN PATENT DOCUMENTS

FR      3046505 A1 *   7/2017

OTHER PUBLICATIONS

Ben-Omrane et al., English Machine Translation of FR3046505 (Year: 2016).*

* cited by examiner

*Primary Examiner* — Rashad H Johnson
(74) *Attorney, Agent, or Firm* — NSIP Law

(57) ABSTRACT

A terminal assembly for a traction motor includes a bus bar having a ring shape and a terminal holder configured to accommodate the bus bar therein to cover an exterior of the bus bar. The terminal assembly includes: the terminal holder which is perforated to form a coupling hole therein through which a surface of the bus bar is exposed; and a temperature sensor unit which is inserted into the coupling hole and senses a temperature of the bus bar.

The terminal assembly for the traction motor according to the present disclosure has a structure in which the temperature sensor unit is coupled to the terminal holder. Thus, the epoxy application process of the related art may be omitted, the occurrence of errors due to the epoxy application may be fundamentally prevented, and the assembly process may be further simplified.

20 Claims, 10 Drawing Sheets

TERMINAL ASSEMBLY FOR TRACTION MOTOR

CROSS-REFERENCE TO RELATED APPLICATION(S)

This application claims priority from and the benefit of Korean Patent Application No. 10-2020-0003352, filed on Jan. 9, 2020, which is hereby incorporated by reference for all purposes as if set forth herein.

TECHNICAL FIELD

Exemplary embodiments relate to a terminal assembly mounted to a traction motor and, more particularly, to a terminal assembly for a traction motor, in which the convenience of assembly may be improved to simplify processes, thereby reducing manufacturing costs.

BACKGROUND

Hybrid vehicles driven by power of an engine and a motor and electric vehicles driven by power of only a motor include traction motors that use electricity to generate power.

Such a traction motor not only generates torque by receiving current from a battery, but also charges the battery by converting energy, which is generated when a vehicle is decelerated and braked, into electricity.

Here, the traction motor includes a terminal assembly that transmits electric energy, which is inputted from the outside, to a rotor.

As illustrated in FIG. 1A, the terminal assembly has a structure, in which a plurality of coils 5 are disposed at predetermined positions along inner circumferential surfaces of a terminal holder 1 (1*a*, 1*b*) having a ring shape, and bus bars 2 having a ring shape and spacers 3 disposed to separate the bus bars 2 are sequentially stacked on each other in the terminal holder 1 (see FIG. 1B).

Here, the traction motor is required to be measured continually so as to monitor a temperature that increases when the rotor rotates. Accordingly, as illustrated in FIG. 1A, a temperature sensor 6 is attached to the coils 5 that generate heat in the traction motor.

In a configuration according to the related art, the temperature sensor 6 has a structure coupled to an end of a cable 7, and after epoxies 8 are applied at about 3 to 4 points predetermined in the coils 5, the cable 7 is bonded thereto. Also, in this case, components described above are required to be inputted into a high-temperature chamber so as to cure the epoxies 8.

However, in a manufacturing method according to the related art, deviations in amounts and positions of the epoxies 8 being applied occur, and thus, errors are likely to occur when the temperature is measured. Also, the high-temperature heating process has to be involved, and thus, a processing time increases.

SUMMARY

Exemplary embodiments of the present disclosure provide a terminal assembly for a traction motor, which is capable of solving the limitations of the related art described above by measuring a temperature of a bus bar instead of measuring a temperature of coils, based on the fact that coils disposed outside the terminal holder has almost the same temperature as the bus bar disposed inside the terminal holder.

A first exemplary embodiment of the present disclosure provides a terminal assembly for a traction motor, which includes a bus bar having a ring shape and a terminal holder configured to accommodate the bus bar therein to cover an exterior of the bus bar, the terminal assembly including: the terminal holder which is perforated to form a coupling hole therein through which a surface of the bus bar is exposed; and a temperature sensor unit which is inserted into the coupling hole and senses a temperature of the bus bar.

The temperature sensor unit includes: a sensor part configured to generate an electrical signal according to a surrounding temperature; a housing configured to accommodate the sensor part therein; and a wire, one end of which enters the housing and is connected to the sensor part and the other end of which extends outward from the housing.

The coupling hole provided in the terminal holder includes: a base portion which is formed with a constant width to a predetermined depth from a top surface of the terminal holder; and an expansion portion which extends from a lower end of the base portion and has a width greater than that of the base portion, wherein the housing includes an upper end portion having a relatively smaller width so as to slidingly enter the base portion and a lower end portion having a relatively larger width so as to slidingly enter the expansion portion.

When the housing is inserted into the coupling hole, a top surface of the housing is provided to be flush with the top surface of the terminal holder so as to provide a continuous flat surface.

Also, the coupling hole and the housing have a shape having stepped portions between the base portion and the expansion portion and between the upper end portion and the lower end portion of the housing. When the housing is inserted into the coupling hole, the housing comes into close contact with the bus bar.

The housing includes a connector which protrudes from a side opposite to a direction in which the wire is drawn out, and the terminal holder includes a connector hole which extends from the coupling hole and into which the connector is inserted.

The connector includes: rod portions disposed parallel to each other; and protrusions respectively protruding from ends of the rod portions in a direction in which a width thereof increases, wherein, while the connector passes through the connector hole, the rod portions are deformed elastically to become narrow so that the protrusions pass through the connector hole, and after the protrusions pass through the connector hole, the rod portions are restored elastically so that the protrusions prevent the connector from being pulled out.

The housing is made of an elastic synthetic resin material.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, the present disclosure will be described in detail with reference to the accompanying drawings so that the present disclosure can be easily carried out by a person skill in the art to which the present disclosure pertains. However, the present disclosure may be embodied in several different forms, and not be limited to the embodiments set forth herein.

Parts unrelated to the description will be omitted so as to clearly describe the present disclosure, and the same reference symbols are given to identical or similar elements throughout the specification.

Also, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her invention in the best ways.

The present disclosure relates to a terminal assembly for a traction motor, which includes a bus bar 30 having a ring shape and a terminal holder 10 for accommodating the bus bar 30 therein to cover an exterior of the bus bar 30. Preferred exemplary embodiments of the present disclosure will now be described in detail with reference to the accompanying drawings.

Figure 1A:
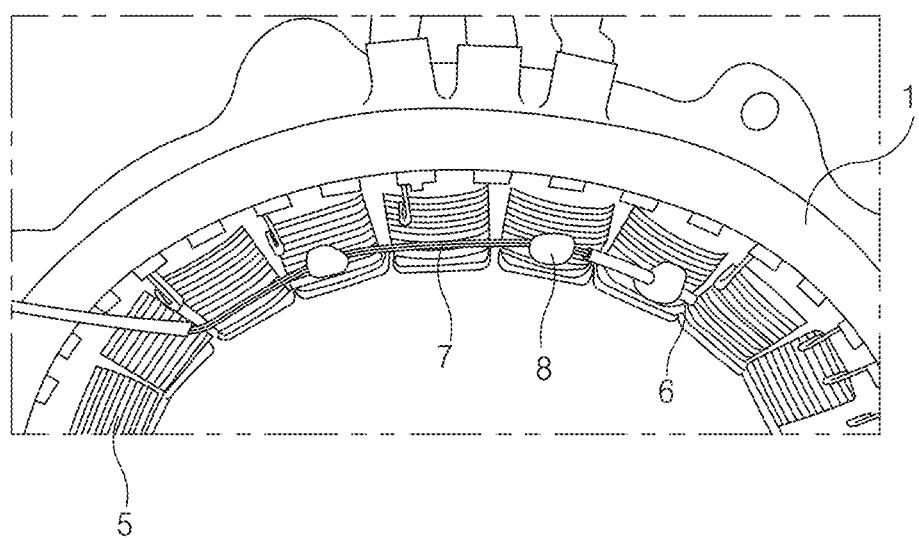
FIG. 1A is a view illustrating a state in which a temperature sensor is mounted to a coil coupled to a terminal holder according to a method of the related art.
Figure 1B:
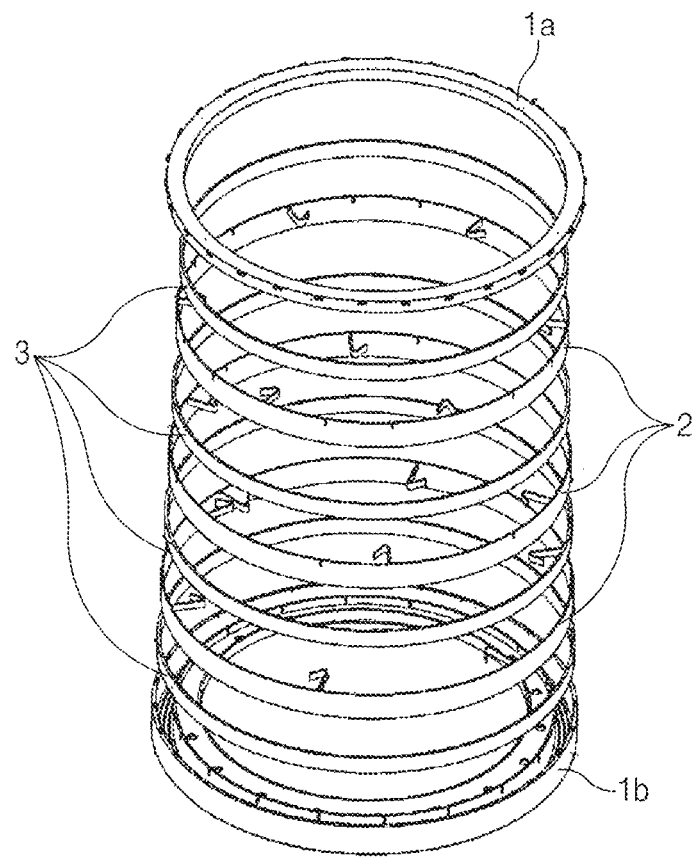
FIG. 1B is a perspective view illustrating a state in which bus bars and spacers, which are mounted in a terminal holder, are separated from each other.
Figure 2:
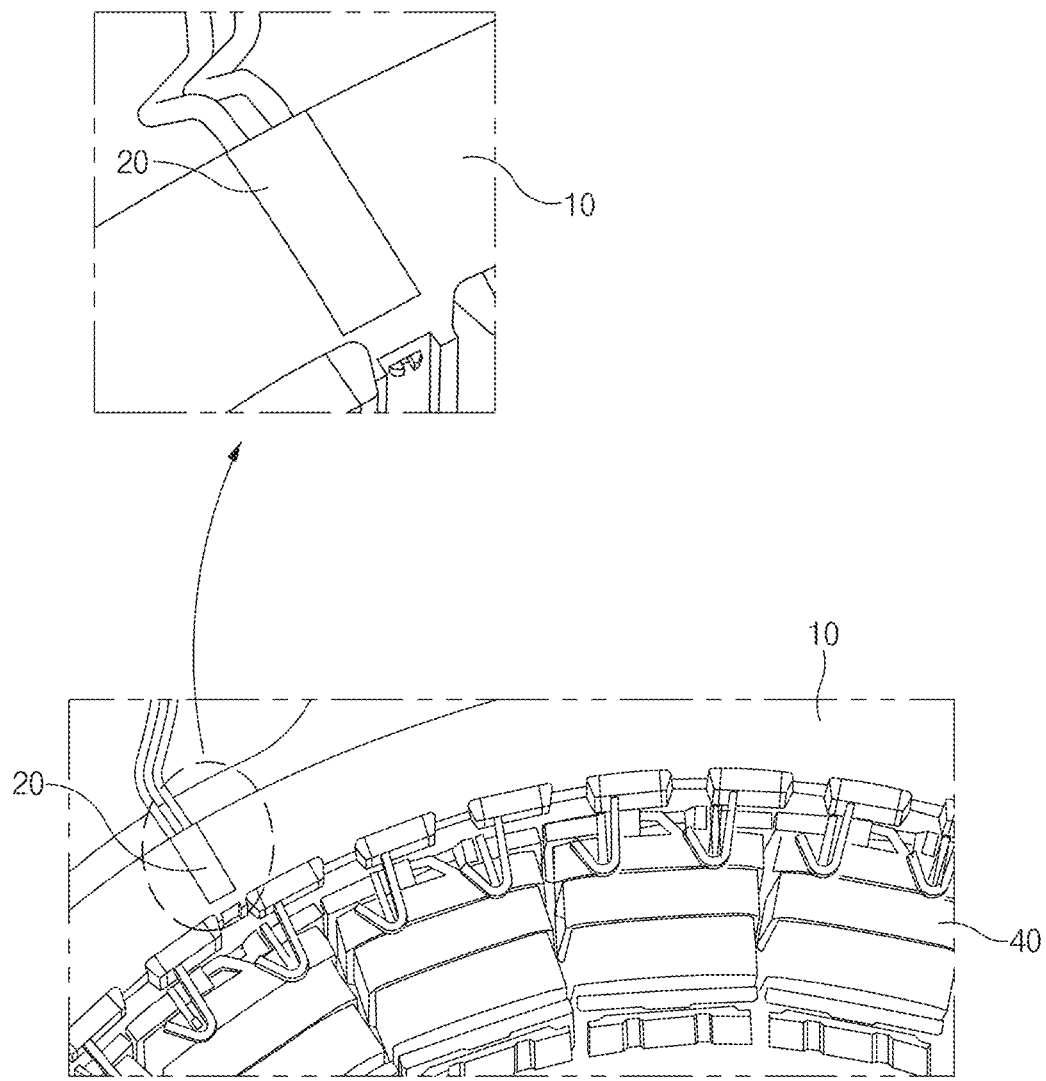
FIG. 2 is a view illustrating a state, in which a temperature sensor unit is coupled to a terminal holder according to the present disclosure, and an enlarged state thereof.
Figure 3:
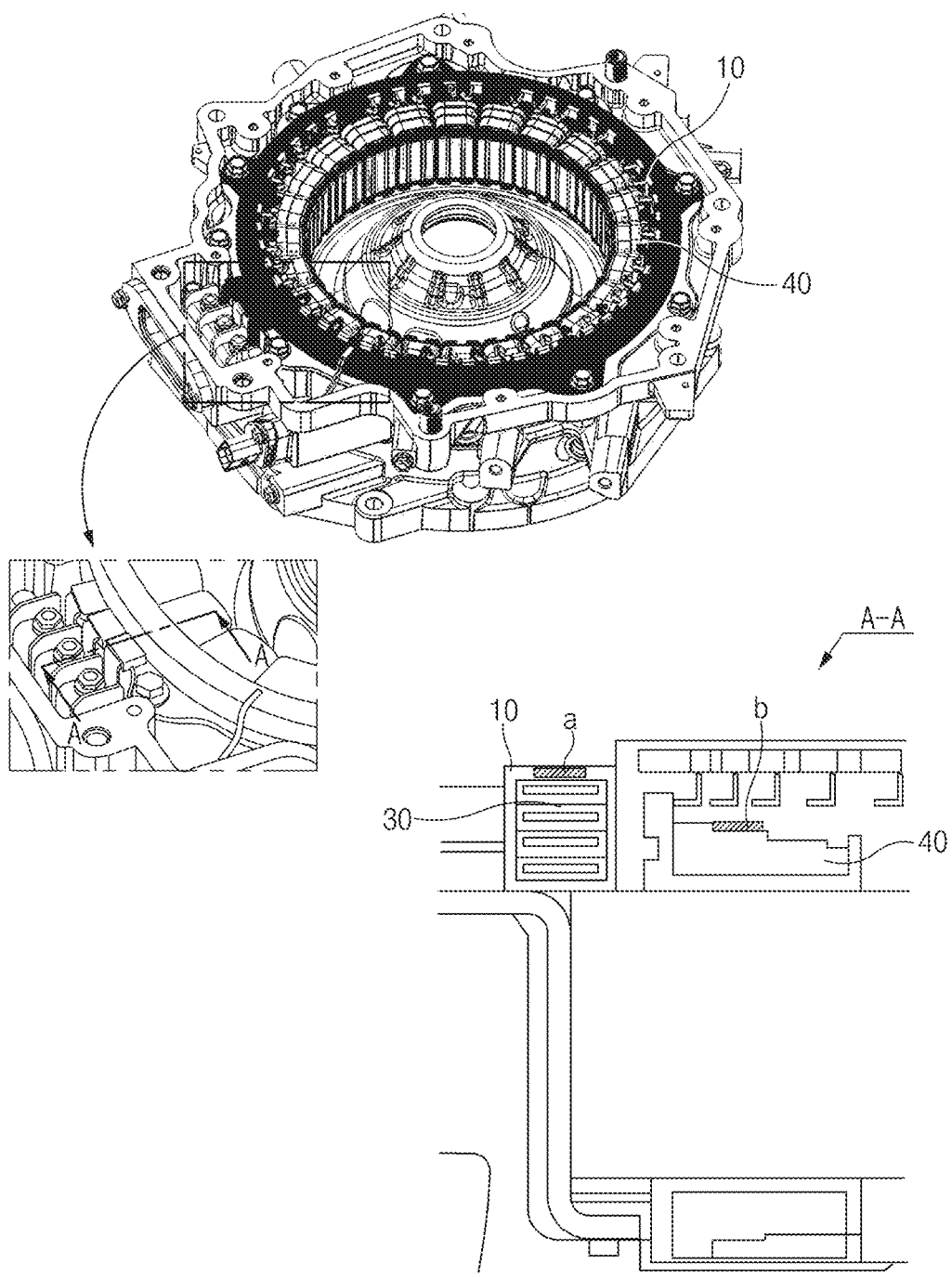
FIG. 3 is a view illustrating a state, in which the terminal holder is mounted to a housing of a traction motor, and a cross-section taken along line A-A.

FIG. 2 illustrates a state, in which a temperature sensor unit 20 is coupled to a terminal holder 10 according to the present disclosure, and an enlarged state thereof. FIG. 3 illustrates a state, in which the terminal holder 10 is mounted to a housing of a traction motor, and a cross-section taken along line A-A. Referring to the drawings mentioned above, the terminal assembly according to the present disclosure may have a structure in which bus bars 30 having a ring shape are mounted inside a terminal holder 10 having a ring shape. This structure is similar with the structure according to the related art. The bus bars 30 are electrically connected to coils 40 respectively corresponding to phases (U-phase, V-phase, and W-phase) of the traction motor, and are stacked while being separated (being insulated) from each other (see a lower drawing of FIG. 3). Also, the terminal holder 10 accommodates the bus bar 30 therein so as to cover the exteriors of the bus bars 30. In addition, the present disclosure is configured such that the temperature sensor unit 20 is coupled to the terminal holder 10 rather than to the coils 40. That is, as illustrated in FIG. 3, the temperature sensor is positioned at a point 'b' on the coils 40 in the configuration of the related art. However, the present disclosure has a configuration in which the mounting position of the temperature sensor unit is changed into a point 'a'.

Figure 4:
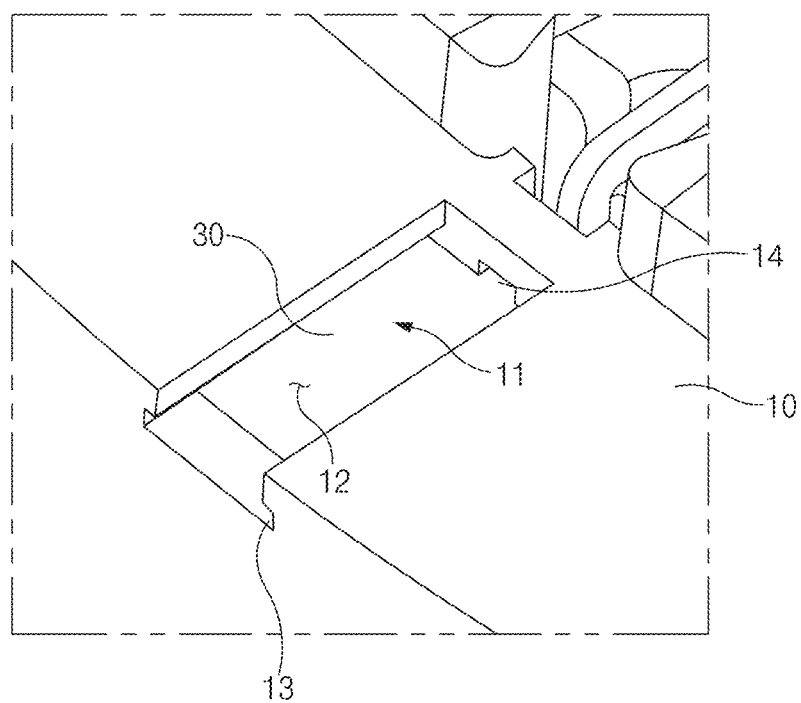
FIG. 4 is a perspective view illustrating a state in which a coupling hole is provided in the terminal holder.

Also, referring to FIG. 4, the terminal holder 10 of the present disclosure is perforated to form a coupling hole 11 through which a surface of the bus bar 30 is exposed.

The coupling hole 11 includes a base portion 12 which is formed with a constant width to a predetermined depth from a top surface of the terminal holder 10 and an expansion portion 13 which extends from a lower end (a lower portion in FIG. 4) of the base portion 12 and has a width greater than that of the base portion 12.

The base portion 12 is formed to have an area corresponding to a size of a housing 21 of the temperature sensor unit 20 to be mounted to the coupling hole 11, and the portion thereof to expose the bus bar 30 to the outside is not biased to a specific position but disposed at a position in which the temperature of a central region of the bus bar 30 may be measured. The expansion portion 13 extends from the lower end of the base portion 12 and has a shape with a width greater than that of the base portion 12 so that a stepped portion is provided.

Figure 5A:
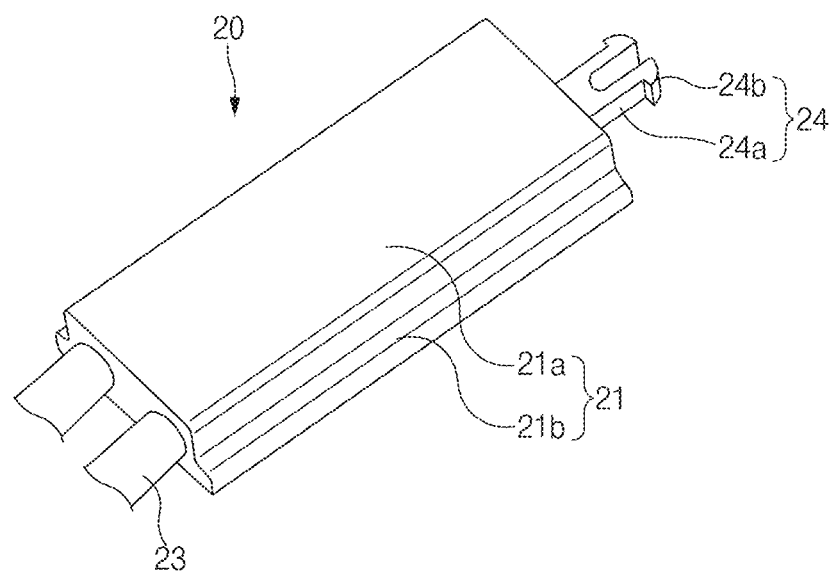
FIG. 5A is a perspective view of the temperature sensor unit according to the present disclosure.
Figure 5B:
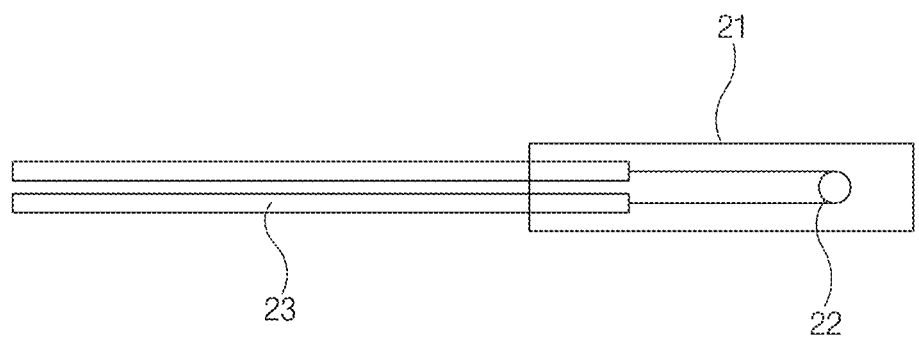
FIG. 5B is a view showing the inside of the temperature sensor unit according to the present disclosure.
Figure 5C:
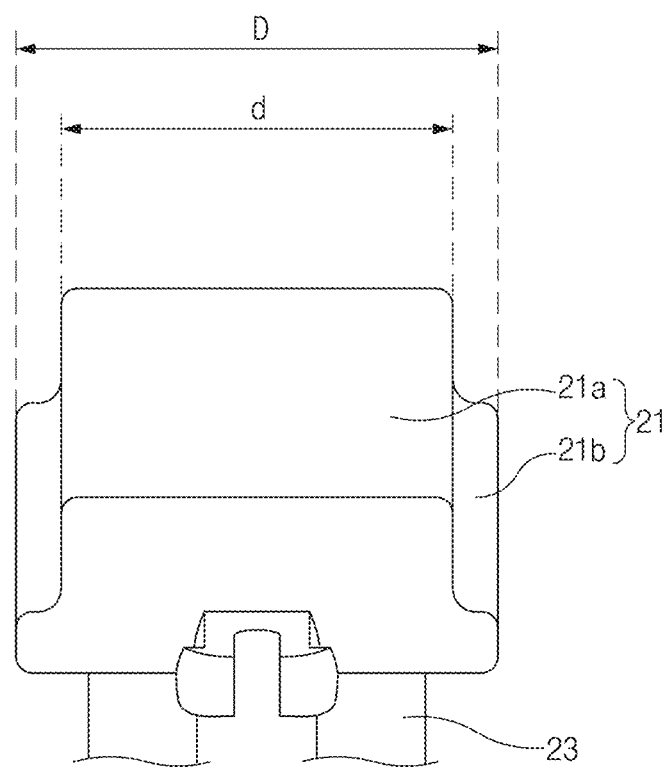
FIG. 5C is a perspective view of the temperature sensor unit of FIG. 5A which is viewed when a connector is placed in the front and a wire is placed in the rear.

FIGS. 5A to 5C are a perspective view of the temperature sensor unit 20 according to the present disclosure, a see-through view thereof, and a perspective view thereof viewed from another direction.

Referring to the drawings, the temperature sensor unit 20, which is inserted into the coupling hole 11 and comes into contact with the surface of the bus bar 30 to sense the temperature thereof, includes: a sensor part 22 for generating an electrical signal according to a surrounding temperature; a housing 21 for accommodating the sensor part 22 therein; and a wire 23, one end of which enters the housing 21 and is connected to the sensor part 22 and the other end of which extends outward from the housing 21.

The sensor part 22 may be a voltage output sensor which outputs, as an electrical signal, a change in potential difference occurring according to a change in temperature, a current output sensor which outputs, as an electrical signal, a change in amount of flowing current according to a change in temperature, or a digital temperature sensor which outputs, as a digital signal, a change in temperature.

The sensor part 22 is accommodated inside the housing 21, and the housing 21 has a shape which may enter the coupling hole 11. That is, an upper end portion 21a of the housing 21 has a relatively smaller width d to be able to enter the base portion 12, and a lower end portion 21b thereof has a relatively larger width D to be able to enter the expansion portion 13.

Figure 6:
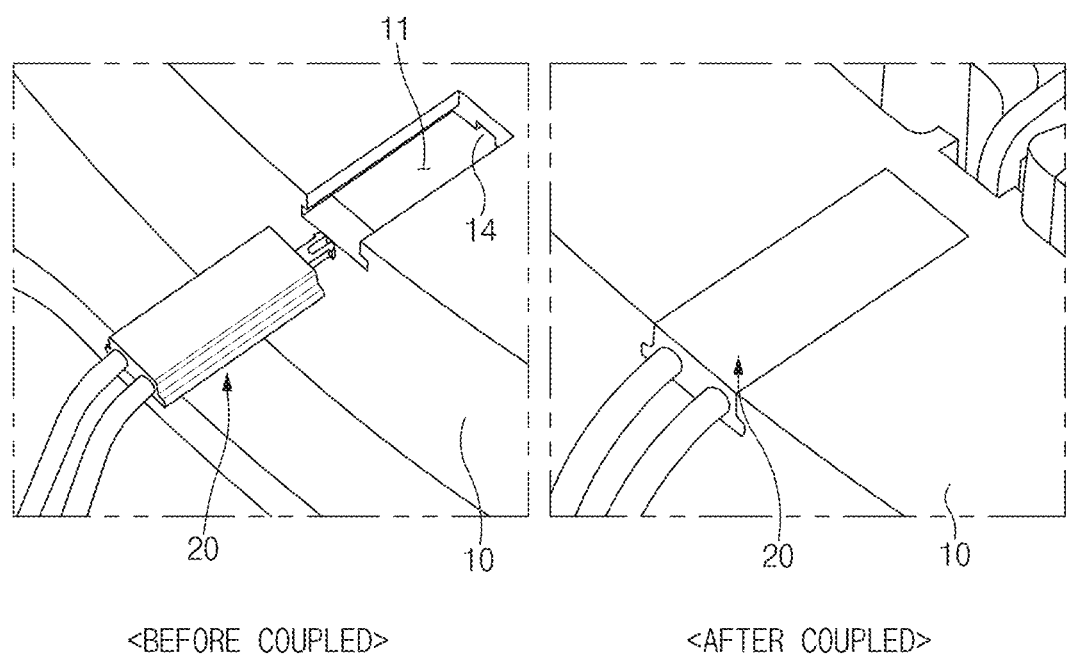
FIG. 6 is a view illustrating states before and after the temperature sensor unit according to the present disclosure is coupled to the terminal holder.

The overall shape of the housing 21 is not limited as long as the housing 21 is insertable into the coupling hole 11, but it is desirable that the top surface of the housing 21 is provided to be flush with the top surface of the terminal holder 10 so as to provide a continuous flat surface. Thus, the surface of the terminal holder 10 may be maintained to be flat after the housing 21 is coupled to the coupling hole 11 as illustrated in FIG. 6.

Also, stepped portions provided between the base portion 12 and the expansion portion 13 and between the upper end portion 21a and the lower end portion 21b of the housing 21 may have a rounded shape rather than an angled shape depending on a processing method. Also, when the housing 21 is inserted into the coupling hole 11, the housing 21 comes into close contact with the surface of the bus bar 30.

In addition, a connector 24 protrudes from an end of the housing 21 on the opposite side (that is, a direction of entering the coupling hole) to a direction in which the wire 23 connected to the sensor part 22 inside the housing 21 is drawn out. As more clearly illustrated in FIG. 5A, the connector 24 includes: two rod portions 24a disposed parallel to each other; and protrusions 24b respectively protruding from ends of the rod portions 24a in a direction in which a width of the connector 24 increases. Here, ends of the protrusions 24b on the side entering a connector hole 14, which will be described later, have a rounded shape so that the protrusions 24b are able to easily pass through the connector hole 14.

Figure 7:
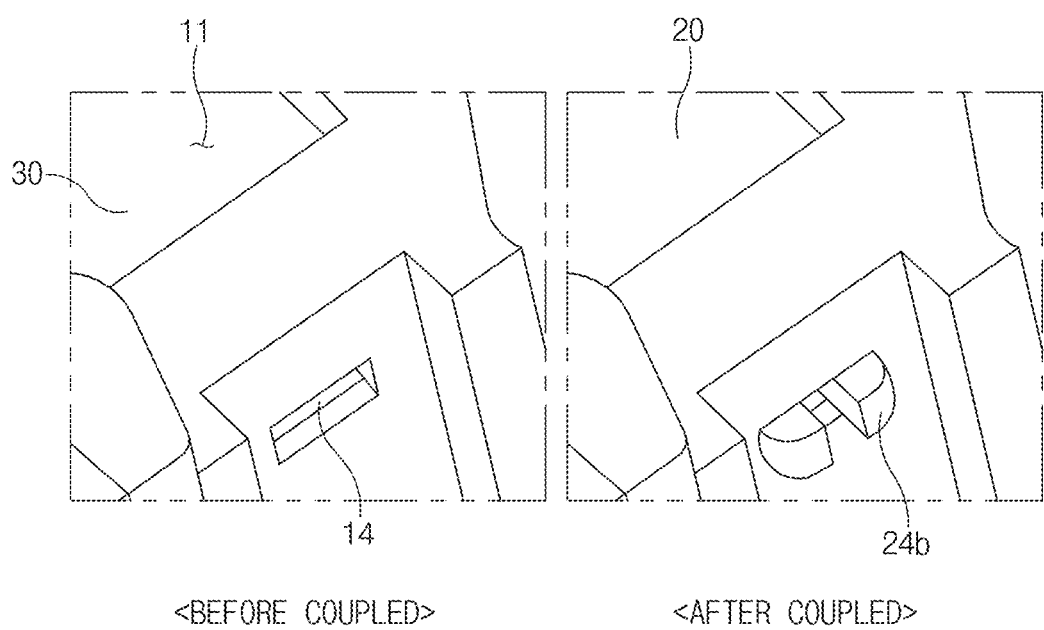
FIG. 7 is a view illustrating states before and after the temperature sensor unit is coupled to the terminal holder when viewed in a direction opposite to that in FIG. 6.

In addition, the connector hole 14 extending from the coupling hole 11 is provided in the terminal holder 10. The connector hole 14 is provided such that after the connector 24 is inserted, the protrusions 24b are able to protrude from the opposite side as illustrated in FIG. 7. While the protrusions 24b pass through the connector hole 14, the rod portions 24a are deformed elastically in a direction in which the rod portions 24a approach each other (in a direction in which the width is reduced). Then, after the protrusions 24b pass through the connector hole 14, the rod portions 24a are restored elastically, and the coupling to the connector hole 14 is made. Thus, the housing 21 is made of a material having sufficient elastic restoring force, for example, a synthetic resin material.

The terminal assembly according to the present disclosure, which has the configuration described above, has a structure in which the temperature sensor unit 20 is coupled to the terminal holder 10. Thus, the epoxy application process of the related art may be omitted, the occurrence of errors due to the epoxy application may be fundamentally prevented, and the assembly process may be further simplified.

The temperature sensor unit 20 of the present disclosure is inserted into the terminal holder 10 and coupled thereto, and is configured to be flush with the terminal holder 10 and thus easily assembled. Also, the temperature sensor unit 20 has no protruding portion after assembled, and thus, the interference with other components may be prevented.

The movement of the housing 21 of the temperature sensor unit 20 is constrained at two places such as the lower end portion and the connector when the housing 21 is coupled to the terminal holder 10, and thus, the coupled state may be more firmly maintained.

The terminal assembly for the traction motor according to the present disclosure, which has the configuration described above, has a structure in which the temperature sensor unit is coupled to the terminal holder. Thus, the epoxy application process of the related art may be omitted, the occurrence of errors due to the epoxy application may be fundamentally prevented, and the assembly process may be further simplified.

The temperature sensor unit of the present disclosure is inserted into the terminal holder and coupled thereto, and is configured to be flush with the terminal holder and thus easily assembled. Also, the temperature sensor unit has no protruding portion after assembled, and thus, the interference with other components may be prevented.

The movement of the housing of the temperature sensor unit is constrained at two places such as the lower end portion and the connector when the housing is coupled to the terminal holder, and thus, the coupled state may be more firmly maintained.

Although the present disclosure is described by specific embodiments and drawings, the present disclosure is not limited thereto, and various changes and modifications may be made by a person skilled in the art to which the present disclosure pertains within the technical idea of the present disclosure and equivalent scope of the appended claims.

What is claimed is:

1. A terminal assembly for a traction motor, comprising a bus bar having a ring shape and a terminal holder configured to accommodate the bus bar therein to cover an exterior of the bus bar, the terminal assembly comprising:
    the terminal holder which is perforated to form a coupling hole therein through which a surface of the bus bar is exposed, wherein the coupling hole forms a base portion which is formed with a constant width to a predetermined depth from a top surface of the terminal holder and an expansion portion which extends from a lower end of the base portion and has a width greater than that of the base portion; and
    a temperature sensor unit which is inserted into the coupling hole and senses a temperature of the bus bar.

2. The terminal assembly of claim 1, wherein the temperature sensor unit comprises:
    a sensor part configured to generate an electrical signal according to a surrounding temperature;
    a housing configured to accommodate the sensor part therein; and
    a wire, wherein one end of the wire enters the housing and is connected to the sensor part and a second end of the wire extends outward from the housing.

3. The terminal assembly of claim 2,
    wherein the housing comprises an upper end portion having a relatively smaller width so as to slidingly enter the base portion and a lower end portion having a relatively larger width so as to slidingly enter the expansion portion.

4. The terminal assembly of claim 3, wherein, when the housing is inserted into the coupling hole, a top surface of the housing is provided to be flush with the top surface of the terminal holder so as to provide a continuous flat surface.

5. The terminal assembly of claim 3, wherein the coupling hole and the housing have a shape having stepped portions between the base portion and the expansion portion and between the upper end portion and the lower end portion of the housing.

6. The terminal assembly of claim 3, wherein, when the housing is inserted into the coupling hole, the housing comes into close contact with the bus bar.

7. The terminal assembly of claim 3, wherein the housing comprises a connector which protrudes from a side opposite to a direction in which the wire is drawn out, and
    the terminal holder comprises a connector hole which extends from the coupling hole and into which the connector is inserted.

8. The terminal assembly of claim 7, wherein the connector comprises:
    rod portions disposed parallel to each other; and
    protrusions respectively protruding from ends of the rod portions in a direction in which a width thereof increases,
    wherein, while the connector passes through the connector hole, the rod portions are deformed elastically to become narrow so that the protrusions pass through the connector hole, and after the protrusions pass through the connector hole, the rod portions are restored elastically so that the protrusions prevent the connector from being pulled out.

9. The terminal assembly of claim 8, wherein the housing is made of an elastic synthetic resin material.

10. A terminal holder configured to cover a surface of a ring-shaped bus bar of a terminal assembly for a traction motor, the terminal holder comprising a ring-shape portion, wherein the terminal holder defines a coupling hole,
wherein the coupling hole defines a base portion formed with a constant width to a predetermined depth from a top surface of the terminal holder,
wherein a connector hole extends from the coupling hole into the ring-shaped portion from the base portion, and
wherein the coupling hole further defines an expansion portion which extends from a lower end of the base portion and has a width greater than that of the base portion.

11. The terminal holder of claim 10, wherein a housing unit is received into the expansion portion, the housing unit comprising an upper end portion having a relatively smaller width so as to slidingly enter the base portion and a lower end portion having a relatively larger width so as to slidingly enter the expansion portion.

12. The terminal holder of claim 11, wherein the housing unit further comprises a temperature sensor unit is configured to sense a temperature of the ring-shaped bus bar, and wherein the temperature sensor unit is provided in the coupling hole through which a surface of the ring-shaped bus bar is exposed.

13. The terminal holder of claim 12, wherein the housing unit further comprises a connector which protrudes from a side opposite to a direction in which a wire from the temperature sensing unit is drawn out, and wherein the connector comprises:
rod portions disposed parallel to each other; and
protrusions respectively protruding from ends of the rod portions in a direction in which a width thereof increases,
wherein, while the connector passes through the connector hole defined in the terminal holder associated with the coupling hole, the rod portions being deformed elastically to become narrow so that the protrusions pass through the connector hole, and after the protrusions pass through the connector hole, the rod portions are restored elastically so that the protrusions prevent the connector from being pulled out.

14. The terminal holder of claim 11, wherein, when the housing unit is inserted into the coupling hole, a top surface of the housing is provided to be flush with the top surface of the terminal holder so as to provide a continuous flat surface.

15. The terminal holder of claim 11, wherein the coupling hole and the housing unit have a shape have stepped portions between the base portion and the expansion portion and between the upper end portion and the lower end portion of the housing.

16. A terminal assembly, comprising:
a bus bar having a ring shape;
a terminal holder configured to cover an exterior of the bus bar, wherein the terminal holder defines a coupling hole therein through which a surface of the bus bar is exposed, wherein the coupling hole defines a base portion formed with a constant width to a predetermined depth from a top surface of the terminal holder, and wherein the coupling hole further defines an expansion portion which extends from a lower end of the base portion and has a width greater than that of the base portion;
a temperature sensor unit configured to sense a temperature of the bus bar, wherein the temperature sensor unit is inserted into the coupling hole; and
a housing unit configured to accommodate the temperature sensor unit therein, wherein the housing unit comprises an upper end portion having a relatively smaller width so as to slidingly enter the base portion and a lower end portion having a relatively larger width so as to slidingly enter the expansion portion.

17. The terminal assembly of claim 16, wherein a connector hole is defined in the terminal holder to extend from the coupling hole from the base portion.

18. The terminal assembly of claim 17, wherein the housing unit comprises a connector which protrudes from a side opposite to a direction in which a wire from the temperature sensing unit is drawn out, and
wherein the connector is inserted into the connector hole.

19. The terminal assembly of claim 16, wherein the temperature sensor unit comprises:
a sensor part configured to generate an electrical signal according to a surrounding temperature; and
a wire, wherein one end of the wire enters the housing unit and is connected to the sensor part and a second end of the wire extends outward from the housing unit.

20. The terminal assembly of claim 19, wherein the housing unit further comprises a connector comprising:
rod portions disposed parallel to each other; and
protrusions respectively protruding from ends of the rod portions in a direction in which a width thereof increases,
wherein, while the connector passes through a connector hole defined in the terminal holder associated with the coupling hole, the rod portions being deformed elastically to become narrow so that the protrusions pass through the connector hole, and after the protrusions pass through the connector hole, the rod portions are restored elastically so that the protrusions prevent the connector from being pulled out.

* * * * *